Figure 1:
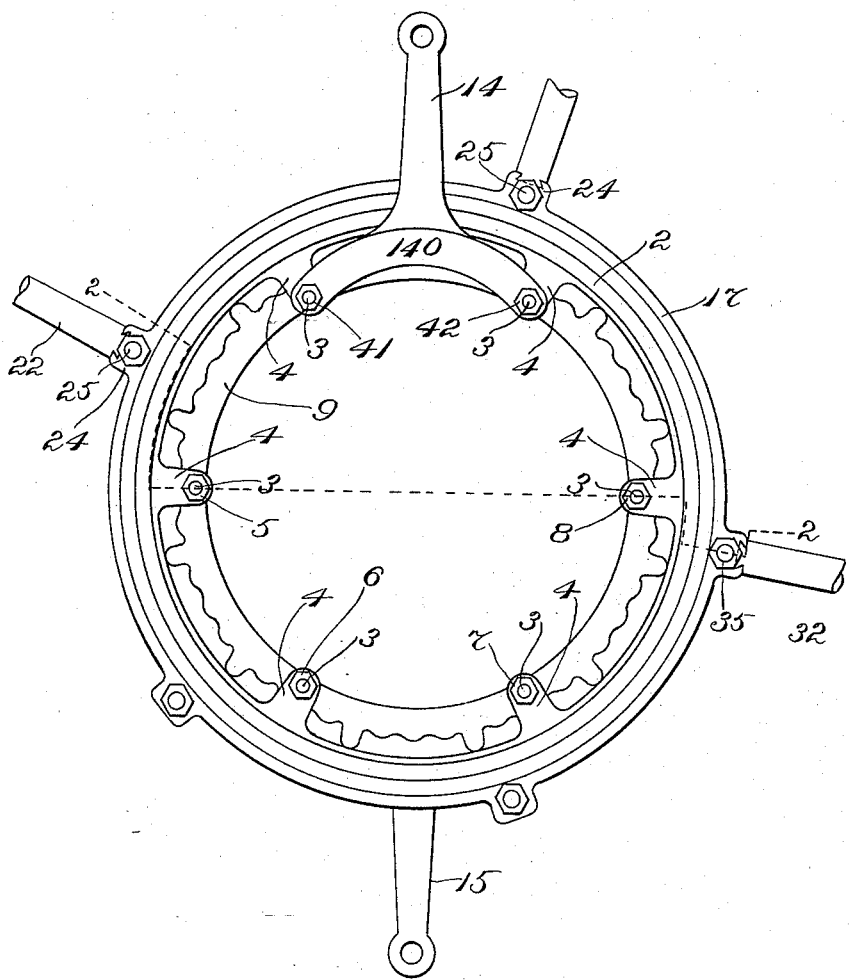

(No Model.)  
2 Sheets—Sheet 1.

J. P. ARCHDEACON.
AXLELESS SPROCKET FOR BICYCLES.

No. 605,214.  
Patented June 7, 1898.

Witnesses:  
Oscar F. Hill  
Robert Wallace.

Inventor.  
John P. Archdeacon  
by W. A. Copeland.  
Attorney.

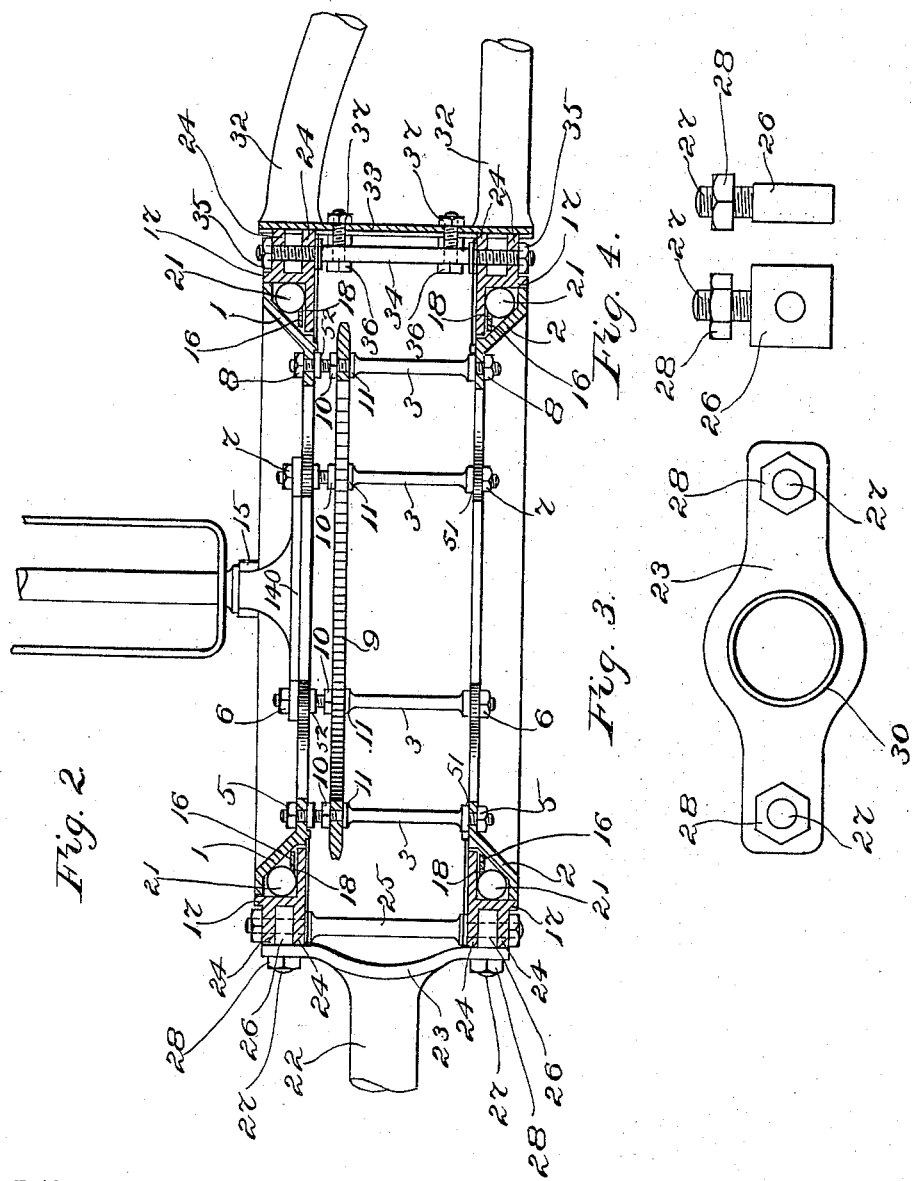

UNITED STATES PATENT OFFICE.

JOHN P. ARCHDEACON, OF BOSTON, MASSACHUSETTS, ASSIGNOR OF ONE-HALF TO FRANK L. WHITCOMB, OF SAME PLACE.

AXLELESS SPROCKET FOR BICYCLES.

SPECIFICATION forming part of Letters Patent No. 605,214, dated June 7, 1898.

Application filed September 23, 1897. Serial No. 652,698. (No model.)

*To all whom it may concern:*

Be it known that I, JOHN P. ARCHDEACON, a citizen of the United States, residing at Boston, in the county of Suffolk and State of Massachusetts, have invented a new and useful Axleless Sprocket for Bicycles and Velocipedes, of which the following, taken in connection with the accompanying drawings, is a specification.

My invention relates to an axleless sprocket; and it consists in the novel features which will be described hereinafter and particularly pointed out in the claims at the end of the specification.

In the drawings, Figure 1 is a side elevation showing a sprocket with box, cone, and cranks, illustrating my invention. Fig. 2 is a section on line 2 2 of Fig. 1. Fig. 3 is a detail plan of one of the crowns. Fig. 4 is a side and end elevation of the block which is employed in attaching the crowns to the box.

The sprocket-wheel 9, instead of having a central axle, is mounted between two rotary side members on transverse supports which connect said rotary members, and the sprocket rotates with said members. The rotary side members which I have shown consist of ring-cones 1 2, mounted on rods 3 3, &c., and rotating on ball-bearings 21 in ring-boxes 17. The cones have ears 4, which are perforated to receive the rods. Said rods are screw-threaded at their ends and provided at each end with clamp-nuts 5, 6, 7, 8, 41, and 42. The ears of cone 2 are clamped against the shoulders 51 on said rods. The ears of cone 1 are clamped against the threaded collars 52 on said rods. Said collars, as well as the nuts, can be moved to allow adjustment of the bearings. The sprocket-wheel 9 is clamped against the shoulders 11 on the rods 3 by the nuts 10. I have shown the supporting-rods as six in number; but the exact number is not material. The sprocket is mounted a little to one side of the middle of the space between the cones, so as to be in line with the sprocket of the rear wheel. The cranks 14 15 are mounted on two of the rods 3 and are clamped by nuts 41 42 against the sides of the cones. Where the cranks are mounted on a central axle of a sprocket whose diameter is, say, four inches and the length of the crank is six inches, under my form of construction the length of the crank will be about two inches, but with the same radius of rotation as before.

While the rotary side members which I have described consist of ring-cones with ball-bearings, I do not intend to limit myself to that particular construction. I claim, broadly, an axleless sprocket mounted on transverse supports between two rotary side members which rotate with said sprocket.

The front stay-post 22 has at its lower end a crown 23, which rests on the ends of the ears 24, which project outwardly from the boxes 17. A cross-bolt 25 passes through holes in these ears and also passes through the blocks 26, which are set one between each pair of ears. These blocks have threaded pins 27, which pass through holes in the crown 23, and have nuts 28, by which the crown is securely clamped and the post held firmly in position.

The seat-post 30 is formed with a crown similar to that of the front stay-post and is secured in the same way by projecting ears on the boxes, cross-bolts 25, and blocks 26.

The rear forks 32 have a cross-bar 33 connecting them at the ends, said cross-bar resting on the ends of ears 24, as in the case of the seat-post and front stay-post, or dovetailed into the said cross-bar, as shown in the drawings. A square-sided bolt 34 passes through the ears and is secured by nuts 35 on the ends. Bolts 36, having nuts 37 on their ends, pass through the cross-bar 33 and the bolt 34 and bind them together, thus holding the forks 32 firmly in position.

What I claim is—

1. An axleless sprocket in combination with a rotary member on each side thereof and transverse supports which pass through said sprocket and connect the rotary side members whereby the sprocket is supported and caused to rotate with said members, substantially as described.

2. In a bicycle or velocipede, rotary ring-cones to which the pedal-cranks are attached, fixed ring-boxes combined with the cones to hold the ball-bearings, and bolts which connect the cones, in combination with an axleless sprocket supported on said connecting-bolts, substantially as described.

In testimony whereof I have signed my name to this specification, in the presence of two subscribing witnesses, on this 20th day of September, A. D. 1897.

JOHN P. ARCHDEACON.

Witnesses:
WILLIAM A. COPELAND,
EDITH J. ANDERSON.